Patented July 9, 1940

2,207,608

UNITED STATES PATENT OFFICE 2,207,608

SEPARATION OF BUTYLENE-1 AND ISO-BUTYLENE FROM MIXTURES CONTAINING SAME

Edgar C. Britton, Howard S. Nutting, and Lee H. Horsley, Midland, Mich., assignors to The Dow Chemical Company, Midland, Mich., a corporation of Michigan No Drawing. Application September 26, 1939, Serial No. 296,672

4 Claims. (Cl. 202—42)

This invention concerns a method of separating butylene-1 and isobutylene from hydrocarbon mixtures containing the same.

Hydrocarbon mixtures comprising butylene-1 and isobutylene are frequently obtained in the pyrolysis of petroleum fractions and other hydrocarbon materials. Frequently the gaseous mixtures containing the butylene-1 and isobutylene also comprise other hydrocarbons such as butane, isobutane, propane, propylene, pentanes, amylenes, etc., but methods are known whereby the butylenes may be separated in concentrated form from other hydrocarbons. Certain of the butylenes may also be separated from a mixture of the isomeric butylenes by very careful distillation, but butylene-1 and isobutylene are reported in the literature as having almost identical boiling points at atmospheric pressure and separation of these butylenes from one another by ordinary distillation at atmospheric or increased pressures is not practicable.

Although certain methods of selectively reacting chemical agents such as sulphuric acid, halogen, etc., with the isobutylene to form products from which the butylene-1 may be separated by distillation are known, such methods involve destruction of the isobutylene and are, therefore, disadvantageous.

We have discovered that butylene-1 and isobutylene may be separated from one another by distilling a mixture of these compounds in the presence of sulphur dioxide. The sulphur dioxide appears to form azeotropes with the butylene-1 and isobutylene which distill at sufficiently different temperatures to permit the separation.

The distillation may be carried out in continuous or batchwise manner and at any desired pressure up to the critical pressure of the mixture. In practice it is preferably carried out at a pressure between 100 pounds and 300 pounds per square inch gauge so as to permit condensation of the distillate without need for refrigeration. At least partial separation of the butylenes from one another may be obtained in such distillation regardless of the proportion of sulphur dioxide employed, but in practice the sulphur dioxide is, of course, used in a proportion sufficient to form an azeotrope with all of the butylene-1 present. This proportion varies somewhat depending on the pressure at which the distillation is to be carried out, but usually approximates about 2 parts by weight of sulphur dioxide per part of butylene-1. The sulphur dioxide may be used in as large a proportion as desired.

In carrying out the distillation a liquefied mixture of the isomeric butylenes is treated with sulphur dioxide, preferably in amount representing two or more times the weight of the butylene-1 present, and the resultant liquid mixture is charged in batchwise or in continuous manner to a still which, as stated above, is preferably operated at a pressure between 100 pounds and 300 pounds per square inch. The azeotropic mixture of butylene-1 and sulphur dioxide distills at a somewhat lower temperature than does either the isobutylene or the azeotropic mixture of isobutylene with sulphur dioxide. Accordingly, the lower boiling fractions of the distillate are enriched in butylene-1, whereas the higher boiling fractions are enriched in isobutylene. By very careful fractionation using an efficient still a considerable proportion of each isomeric butylene may be recovered in a form substantially free of the other in a single distillation. When using ordinary distilling equipment two or more distillations may be required in order to separate each isomer as an individual hydrocarbon. After completing the distillation sulphur dioxide is separated from the butylenes by usual procedure, e. g. washing the sulphur dioxide-containing fractions with water or an aqueous alkali solution.

The following examples illustrate the advantages of the invention and show certain ways in which the invention has been practiced. The first two of the examples describe the distillation of mixtures of butylene-1 and isobutylene in the absence of sulphur dioxide. These examples are presented for purpose of comparison with Examples 3 and 4 which describe the distillation of butylene mixtures in the presence of sulphur dioxide, but under conditions otherwise similar to those employed in Examples 1 and 2, respectively. It will be noted that the Examples 1 and 3 deal with distillations which were carried out at atmospheric pressure, whereas the Examples 2 and 4 deal with distillations carried out at superatmospheric pressure.

EXAMPLE 1

A liquefied mixture of approximately 41 per cent of butylene-1 and 59 per cent of isobutylene was distilled at atmospheric pressure in attempt to separate the isomers from one another. The following table gives the distilling temperature of each fraction, the volume of the fraction as per cent of the volume of the original mixture and the per cent of butylene-1 and of isobutylene in each fraction of distillate and in the residue fraction.

Table I

| Fraction No. | Distilling temp., °C. | Volume percent of original | Butylene-1, percent | Isobutylene, percent |
|---|---|---|---|---|
| 1 | −8.1 | 7 | 38 | 62 |
| 2 | −6.6 | 10 | 38 | 62 |
| 3 | −6.8 | 12 | 38 | 62 |
| 4 | −6.6 | 8 | 38 | 62 |
| 5 | −6.8 | 5 | 38 | 62 |
| 6 | −6.8 | 41 | 40 | 60 |
| Residue | | 17 | 41 | 59 |

Little, if any, separation of the two isomers was effected by the distillation.

EXAMPLE 2

An equimolecular mixture of butylene-1 and isobutylene was carefully distilled at superatmospheric pressure to find whether the application of pressure would promote fractionation. The pressure was varied in distilling the different fractions so as to obtain as complete data as possible on the affect of pressure. Table II gives the volume of each fraction as per cent of the volume of the original mixture, the pressure in pounds per square inch gauge and the temperature at which each fraction was distilled, and the per cent of butylene-1 and of isobutylene in each fraction of distillate and in the residue fraction.

Table II

| Fraction No. | Temperature, °C. | Pressure, lbs./sq. in. | Volume percent of original | Butylene-1, percent | Isobutylene, percent |
|---|---|---|---|---|---|
| 1 | 54 | 94 | 2 | 45 | 55 |
| 2 | 50 | 82 | 5 | 38 | 62 |
| 3 | 48 | 75 | 4 | 50 | 50 |
| 4 | 47 | 73 | 1 | 45 | 55 |
| 5 | 46 | 70 | 9 | 43 | 57 |
| 6 | 45 | 70 | 17 | 40 | 60 |
| 7 | 36 | 52 | 15 | 47 | 53 |
| 8 | 29 | 40 | 14 | 45 | 55 |
| Residue | | | 29 | 57 | 43 |

As will be seen from Table II, satisfactory separation of the isomers was not obtained.

EXAMPLE 3

A liquefied mixture of 9 parts by weight of butylene-1 and 13 parts of isobutylene was admixed with 28 parts of liquid sulphur dioxide and the resultant mixture was fractionally distilled at atmospheric pressure. Table III gives the distilling temperature employed, the volume of each fraction as per cent of the volume of the mixture charged into the still, and the per cent by weight of sulphur dioxide, butylene-1, and isobutylene in each fraction. A "butylene balance" (i. e. the volume of butylenes in each fraction expressed as per cent of the volume of butylenes in the charge to the still and the proportions of butylene-1 and of isobutylene in each fraction expressed as per cent of the combined weight of the two butylenes in the fraction) is also given in order that the separation of the isomers accomplished by the distillation may most clearly be seen.

Table III

| Fraction No. | Distilling temp.,°C. | Composition of fractions | | | | Butylene balance | | |
|---|---|---|---|---|---|---|---|---|
| | | Volume percent of original | SO₂ percent by weight | Butylene-1, percent by weight | Isobutylene, percent by weight | Volume percent of volume in original mixture | Butylene-1, percent of combined weights of butylenes present | Isobutylene, percent of combined weights of butylenes present |
| 1 | −16.2 | 15.7 | 62 | 19 | 19 | 14 | 50 | 50 |
| 2 | −16.2 | 23.5 | 59 | 15.6 | 25.4 | 22 | 38 | 62 |
| 3 | −16.0 | 29.4 | 52 | 15.8 | 32.2 | 31 | 33 | 67 |
| Residue | | 30 | 7 | 14.9 | 78.1 | 31 | 16 | 84 |

In summary of the data in Table III, the butylenes in the entire distillate represented 67 per cent of those charged to the still and of the butylenes in the distillate 38.1 per cent was butylene-1 and 61.9 per cent was isobutylene. The residue, i. e. undistilled portion of the charge, contained 31 per cent of the butylenes in the original mixture and of the butylenes in the residue 84 per cent was isobutylene and 16 per cent was butylene-1. More complete separation of the isomers may be effected by separately distilling in the presence of sulphur dioxide the distillate and the residue from the foregoing distillation.

EXAMPLE 4

A liquefied butylene mixture containing 53 per cent by weight of butylene-1 and 47 per cent of isobutylene was admixed with liquid sulphur dioxide to form a mixture containing 70 per cent by weight of sulphur dioxide. The resultant mixture was distilled under pressure as in Example 2 and the individual fractions were analyzed. Table IV gives the distillation temperatures and the pressures at which the respective fractions were distilled, the volume of each fraction as per cent of the original volume of the mixture, and the per cent by weight of sulphur dioxide, butylene-1, and isobutylene in each fraction. In order that the effectiveness of the distillation in separating the isomeric butylenes from one another may most clearly be seen, the table also includes a "butylene balance," i. e. the volume of butylenes in each fraction as per cent of the volume of butylenes in the original mixture and the proportions of butylene-1 and of isobutylene in each fraction as per cent of the combined weights of the butylenes in the fraction.

Table IV

| Fraction No. | Distilling conditions | | Composition of fractions | | | | Butylene balance | | |
|---|---|---|---|---|---|---|---|---|---|
| | Temp., °C. | Pressure, lbs./sq. in. | Volume percent of original | SO₂ percent by weight | Butylene-1, percent by weight | Isobutylene, percent by weight | Volume percent of volume in original mixture | Butylene-1, percent of combined weights of butylenes present | Isobutylene, percent of combined weights of butylenes present |
| 1 | 49 | 125 | 6 | 68 | 22.8 | 9.3 | 6 | 71 | 29 |
| 2 | 52 | 140 | 4 | 70 | 18.3 | 8.7 | 4 | 61 | 39 |
| 3 | 42 | 100 | 10 | 69 | 25.4 | 5.6 | 10 | 82 | 18 |
| 4 | 37 | 75 | 20 | 64 | 28.5 | 7.6 | 23 | 79 | 21 |
| Residue | | | 60 | 66 | 6.9 | 26.5 | 57 | 21 | 79 |

As may be seen from the data in Table IV, the distillate as a whole contained the butylenes in the proportions of 77 per cent butylene-1 and 23 per cent isobutylene, and in the residue (which contained 57 per cent of the butylenes charged to the still), 79 per cent of the butylene mixture was isobutylene and 21 per cent was butylene-1. More complete separation of the isomeric butylenes may be accomplished by separately distilling in the presence of sulphur dioxide the distillate and the residue fractions from the above-described distillation.

The mixture of butylene-1 and isobutylene employed as starting material in this invention may contain other hydrocarbons such as butylene-2, amylenes, propylene, propane, butanes, pentanes, etc. The presence of such other hydrocarbons does not prevent separation of the butylene-1 and isobutylene from one another by the distillation with sulphur dioxide, although their presence may necessitate the use of a larger proportion of sulphur dioxide than would otherwise be necessary; in most instances the butylene-1 and isobutylene are not only separated from one another but also from such other hydrocarbons during such distillation.

Other modes of applying the principle of the invention may be employed instead of those explained, change being made as regards the method herein disclosed, provided the step or steps stated by any of he following claims or the equivalent of such stated step or steps be employed.

We therefore particularly point out and distinctly claim as our invention:

1. The method which comprises distilling a mixture of butylene-1 and isobutylene in the presence of sulphur dioxide to effect at least partial separation of the isomeric butylenes from one another.

2. In a method for separating butylene-1 and isobutylene from a hydrocarbon mixture comprising the same, the step of distilling the mixture in the presence of sulphur dioxide so as to collect a fraction of distillate which is enriched in butylene-1 and to obtain another fraction which is enriched in isobutylene.

3. The method which comprises adding sulphur dioxide to a hydrocarbon mixture containing butylene-1 and isobutylene and distilling an azeotrope of the sulphur dioxide and butylene-1 from the mixture to leave the isobutylene relatively pure.

4. In a method of separating butylene-1 and isobutylene from a hydrocarbon mixture comprising the same, the steps of adding sulphur dioxide to the hydrocarbon mixture and distilling an azeotrope of sulphur dioxide and butylene-1 from the resultant mixture at a pressure of at least 100 pounds per square inch to leave the isobutylene relatively pure.

EDGAR C. BRITTON.
HOWARD S. NUTTING.
LEE H. HORSLEY.